United States Patent [19]

Killeen et al.

[11] Patent Number: 5,000,965
[45] Date of Patent: Mar. 19, 1991

[54] METHOD FOR THE PREPARATION OF SWEETENING AGENT DELIVERY SYSTEMS CONTAINING POLYVINYL ACETATE

[75] Inventors: Michael J. Killeen, Sparta; Anthony J. Bell, Andover, both of N.J.

[73] Assignee: Warner-Lambert Company, Morris Plains, N.J.

[21] Appl. No.: 482,479

[22] Filed: Feb. 21, 1990

[51] Int. Cl.$^5$ .......................... A23G 3/30; A23L 1/236
[52] U.S. Cl. .......................................... 426/5; 426/96; 426/307; 426/548
[58] Field of Search ........................ 426/3-6, 426/96, 307, 548

[56] References Cited

U.S. PATENT DOCUMENTS

| | | | |
|---|---|---|---|
| 3,795,744 | 3/1974 | Ogawa et al. | 426/3 |
| 4,329,369 | 5/1982 | Tezuka et al. | 426/3 |
| 4,384,004 | 5/1983 | Cea et al. | 426/96 |
| 4,485,118 | 11/1984 | Carroll et al. | 426/3 |
| 4,515,769 | 5/1985 | Merritt et al. | 426/96 |
| 4,740,376 | 4/1988 | Yang | 426/651 |
| 4,931,293 | 6/1990 | Cherukuri et al. | 426/5 |
| 4,933,190 | 6/1990 | Cherukuri et al. | 426/5 |

*Primary Examiner*—Jeanette Hunter
*Attorney, Agent, or Firm*—Craig M. Bell

[57] ABSTRACT

The present invention pertains to a method for preparing a stable sweetening agent delivery system which comprises the steps of (A) providing the following ingredients in percentages by weight of the sweetening agent delivery system (a) at least one solid natural or artificial high intensity sweetening agent present in an amount from about 0.01% to about 50%, (b) an emulsifying agent present in an amount from about 0.5% to about 20%, and (c) polyvinyl acetate present in an amount from about 40% to about 93% and having a molecular weight range from about 2,000 to about 14,000, and (B) coating the sweetening agent with a polyvinyl acetate matrix coating and granulating the coated sweetening agent by a method which comprises the steps (a) melting and blending the polyvinyl acetate with the emulsifying agent and mixing the sweetening agent therein to form a homogeneous mixture in a heated mixing bowl containing a discharge valve in a Double Planetary Mixer, (b) transferring the mixing bowl containing the homogeneous mixture to a Direct Discharge System containing a hydraulic discharge platen, adapted to fit inside the mixing bowl, and hydraulically discharging the mixture from the mixing bowl through the discharge valve into an air and water cooled Hot Melt Granulator, (c) granulating the mixture into particles in the Hot Melt Granulator, (d) cooling and transferring the particles from the Hot Melt Granulator to an Oscillating Granulator by passing the particles through a Cyclone, and (e) granulating the particles in the Oscillating Granulator to a final desired particle size.

20 Claims, 4 Drawing Sheets

METHOD FOR THE PREPARATION OF SWEETENING AGENT DELIVERY SYSTEMS CONTAINING POLYVINYL ACETATE

BACKGROUND OF THE INVENTION

1. Field of the Invention

This invention pertains to an improved method for the preparation of a stable sweetening agent delivery system wherein the sweetening agent is protected by a matrix coating capable of effecting a controlled release of the sweetening agent. The sweetening agent delivery system may be incorporated into chewing gum and confectionery compositions to provide prolonged sweetness. More particularly, this invention pertains to an improved method for the preparation of such sweetening agent delivery systems on commercial scale.

2. Description of the Prior Art

Coatings for sweetening agents (sweeteners) to delay or prolong sweetness, as well as to stabilize sensitive sweetening agents, are well known. Nevertheless, certain sweetening agents, such as Aspartame, are particularly difficult to coat because Aspartame crystals are rod-like, needle-like or dendritic in shape and are particularly difficult to wet. As a result, it is very difficult to coat Aspartame crystals using ordinary mixing and spray coating techniques. To effectively protect Aspartame, a coating must (a) wet and adhere to the crystalline surface, including the needle-like and rod-like tips and other shape variations of the crystal, (b) form a film with a uniform thickness sufficient to provide a barrier against degradative factors such as moisture, pH changes, temperature changes and reactive chemicals, and (c) be flexible enough to conform to crystal surface irregularities without cracking due to mechanical stresses applied during incorporation of the sweetening agent into final products. Attempts to coat Aspartame crystals using mixing and spray techniques to apply simple mixtures of fat and lecithin have resulted in poor wetting and spotty coating of the crystals and hence inadequate protection of the core material against moisture and other degradative factors. Furthermore, many of these coating materials require solvents and water for application, and such solvents and water adversely effect the stability of hydrophilic unstable materials such as Aspartame.

Prior art techniques for coating difficult-to-coat materials such as Aspartame, generally involve spray coating the core material in a fluidized bed or mixing the core material with molten coating material and pulverizing the cooled mixture. Fluidized bed spray coating involves suspending a mass of core material in a stream of air passing through a zone of atomized droplets of the coating material. Spray coating of Aspartame in a fluidized bed system is difficult because Aspartame is a low density material, has a large surface to weight ratio and has poor wetting characteristics. Forming a molten mixture of coating material with the sweetening agent, pulverizing the solidified mixture results in particles which are incompletely coated and which are not adequately protected. On a large commercial scale, coating these difficult-to-coat materials is even more difficult.

U.S. Pat. No. 4,384,004, issued to Cea et al., discloses solid particles of Aspartame encapsulated by a coating material selected from the group consisting of cellulose, cellulose derivatives, arabinogalactin, gum arabic, polyolefins, waxes, vinyl polymers, gelatin, zein, and mixtures thereof. The Aspartame particles are suspended in a stream of air that passes through a zone of atomized liquid droplets of the coating material. More than one coating may be used whereby the inner coating is water-soluble and the outer coating is water-soluble.

U.S. Pat. No. 4,122,195 and U.S. Pat. No. 4,139,939, issued to Bahoshy et al., coat Aspartame by spray drying a mixture of Aspartame and a film forming agent with a material such as gum arabic or the reaction product of a compound containing a polyvalent metallic ion, with an ungelatinized acid-ester of a substituted dicarboxylic acid.

U.S. Pat. No. 4,374,858, issued to Glass et al., discloses a sweetened chewing gum comprising Aspartame having improved sweetness stability wherein the chewing gum piece has Aspartame coated on the gum surface, as opposed to incorporating Aspartame in the chewing gum mix.

U.S. Pat. No. 4,105,801, issued to Degliotti, discloses a confectionery composition comprising a core portion and a shell enveloping the core portion, whereby the shell comprises an intimate mixture of microcrystals of xylitol with a solid fatty substance in a proportion of 0.5 to 15 parts of fatty substance to 100 parts of xylitol by weight. The fatty substance is preferably a mono-, di- or triglyceride having a melting range between 20° C. and 60° C.

U.S. Pat. No. 3,389,000, issued to Toyonaka et al., discloses a spray drying process for preparing granular coated nucleoside-5-phosphates. The coatings may be edible animal and plant fats melting between 40° C.–100° C. such as hydrogenated oils including soybean oil, cottonseed oil, almond oil, castor oil, linseed oil, mustard oil, olive oil, grapefruit seed oil, palm oil, palm kernel oil, rapeseed oil, rice bran oil, and the like, and mixtures of these oils.

U.S. Pat. No. 4,382,924, issued to Berling, discloses liquid oral dosage forms for vitamins or pharmaceutical materials comprising an edible oil, a high potency lipid soluble sweetening agent such as Saccharin and a lipid soluble flavorant. The edible oil may be a polyol fatty acid ester having at least four fatty acid ester groups and each fatty acid having from about 8 to about 22 carbon atoms. The oil, sweetening agent and flavor oil are heated and mixed, then cooled to provide a palatable liquid dosage form.

For a general discussion of spray coating fatty materials onto sweetening agents, and the like, see U.S. Pat. No. 3,949,094 and U.S. Pat. No. 3,976,794, issued to Johnson, and U.S. Pat. No. 3,867,556, issued to Darragh. U.S. Pat. No. 4,293,572, issued to Silva et al., discloses the application of a dispersion of an emulsified fat with a solution of dextrin, Saccharin or a polysaccharide to a food product as a barrier against moisture.

European patent application number 81110320.0, published June 16, 1982, to Ajinomoto-Co., Inc., discloses a stabilized dipeptide-based sweetening composition comprising in percentages by weight (a) from 20% to 60% of solid fat, (b) from 10% to 30% of emulsifier, (c) from 10% to 30% of polysaccharide, and (d) not more than 30% of a dipeptide sweetening agent. The compositions are prepared by spray coating the sweetening agent or by heating and mixing a mixture of sweetening agent and coating material, cooling the mixture, then pulverizing the mixture to obtain powder or granules.

U.S. Pat. No. 4,597,970, issued to Sharma et al., discloses a delivery system wherein a sweetening agent is coated with a mixture of fatty acid or wax, lecithin and monoglyceride. The delivery system protects and controls release of the sweetening agent.

U.S. Pat. No. 4,816,265, issued to Cherukuri et al., discloses a chewing gum composition containing a sweetening agent delivery system which consists essentially of (a) at least one solid natural or artificial high intensity sweetening agent present in an amount from about 0.01% to about 50%, (b) an emulsifying agent present in an amount from about 0.5% to about 20%, and (c) polyvinyl acetate present in an amount from about 40% to about 93% and having a molecular weight range from about 2,000 to about 14,000. The method disclosed for preparing the sweetening agent delivery system is designed for small scale preparations of coated material and is not convenient on a commercial scale.

Thus, numerous methods are known for preparing coated sweetening agents which have varying degrees of effectiveness in protecting, and providing controlled release of, the core material. None of these methods however provides an effective means on commercial scale for coating core materials which are sensitive and have crystalline structures which are difficult to wet and to coat. The present invention provides such a method for preparing a stable sweetening agent delivery system wherein the sweetening agent core material is protected by a matrix coating which is also capable of providing controlled release of the sweetening agent. More particularly, the present invention provides a method for preparing a stable sweetening agent delivery system on commercial scale.

SUMMARY OF THE INVENTION

The present invention pertains to a method for preparing a stable sweetening agent delivery system which comprises the steps of (A) providing the following ingredients in percentages by weight of the sweetening agent delivery system (a) at least one solid natural or artificial high intensity sweetening agent present in an amount from about 0.01% to about 50%, (b) an emulsifying agent present in an amount from about 0.5% to about 20%, and (c) polyvinyl acetate present in an amount from about 40% to about 93% and having a molecular weight range from about 2,000 to about 14,000, and (B) coating the sweetening agent with a polyvinyl acetate matrix coating and granulating the coated sweetening agent by a method which comprises the steps (a) melting and blending the polyvinyl acetate with the emulsifying agent and mixing the sweetening agent therein to form a homogeneous mixture in a heated mixing bowl containing a discharge valve in a Double Planetary Mixer, (b) transferring the mixing bowl containing the homogeneous mixture to a Direct Discharge System containing a hydraulic discharge platen, adapted to fit inside the mixing bowl, and hydraulically discharging the mixture from the mixing bowl through the discharge valve into an air and water cooled Hot Melt Granulator, (c) granulating the mixture into particles in the Hot Melt Granulator, (d) cooling and transferring the particles from the Hot Melt Granulator to an Oscillating Granulator by passing the particles through a Cyclone, and (e) granulating the particles in the Oscillating Granulator to a final desired particle size.

DETAILED DESCRIPTION OF THE INVENTION

Figure 1:
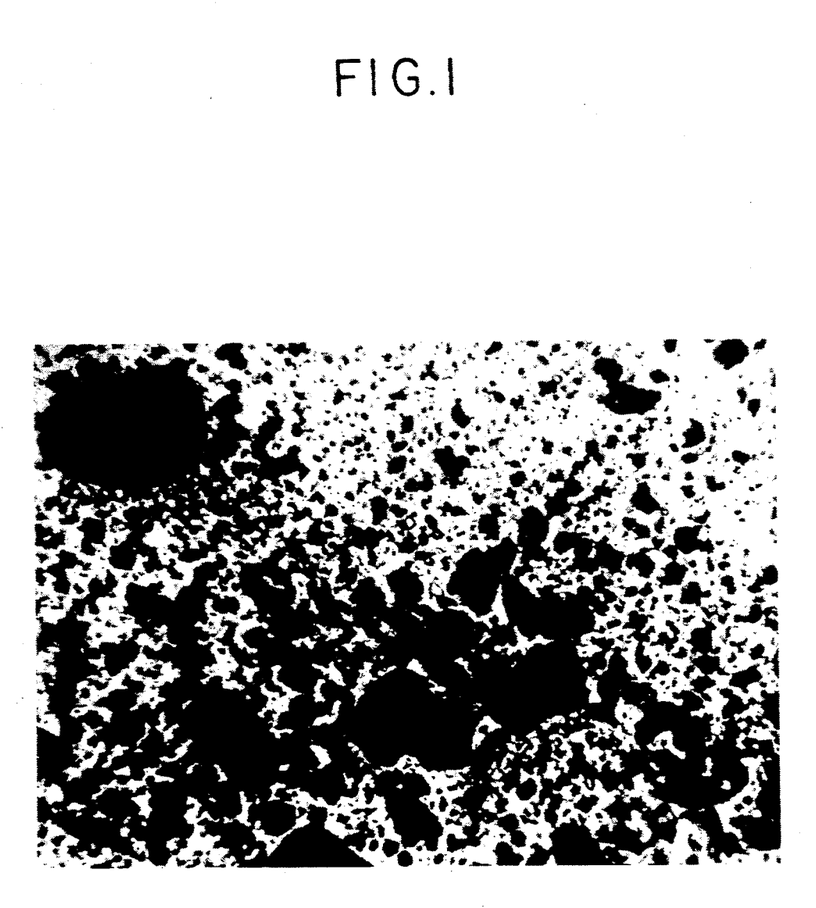
FIG. 1 is a photomicrograph of polyvinyl acetate coated Saccharin crystals ($\times 40$) having a particle size range of 10 microns to 610 microns prepared according to the method of the present invention.
Figure 2:
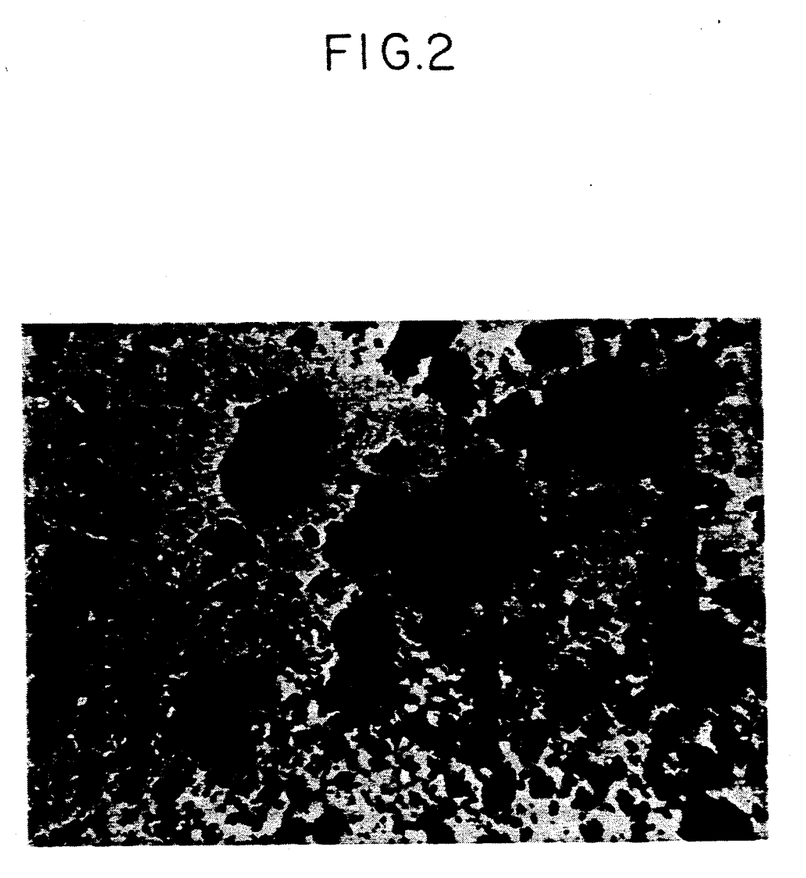
FIG. 2 is a photomicrograph of polyvinyl acetate coated Saccharin crystals ($\times 40$) having a particle size range of 15 microns to 645 microns prepared according to the method of the present invention.
Figure 3:
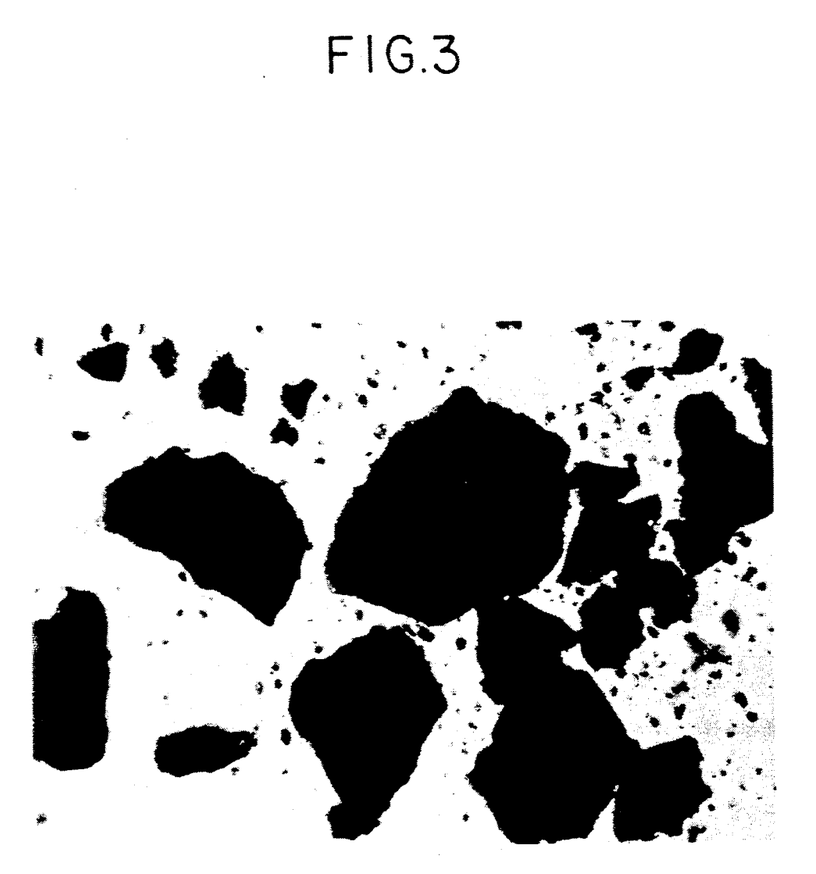
FIG. 3 is a photomicrograph of polyvinyl acetate coated Saccharin crystals ($\times 40$) having a particle size range of 15 microns to 1100 microns prepared according to the method of the present invention.
Figure 4:
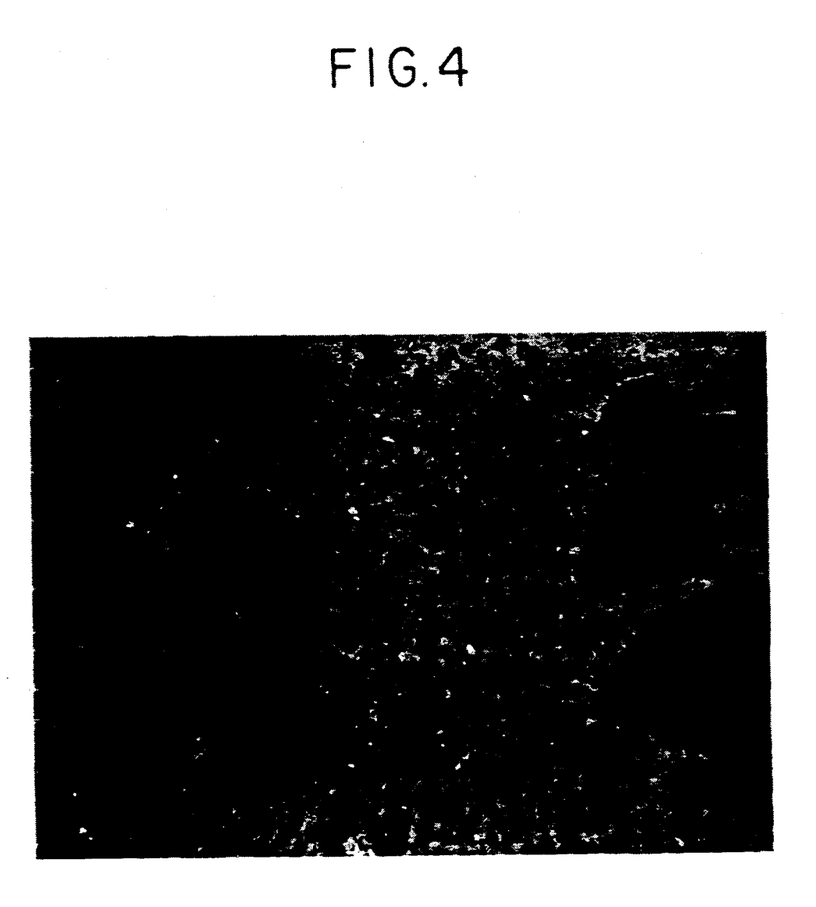
FIG. 4 is a photomicrograph of polyvinyl acetate coated Saccharin crystals ($\times 40$) having a particle size range of 15 microns to 830 microns prepared according to the method of the present invention.

The present invention pertains to a method for preparing a stable sweetening agent delivery system wherein the sweetening agent core material is protected by a matrix coating which is also capable of providing controlled release of the sweetening agent. More particularly, the present invention provides a method for preparing a stable sweetening agent delivery system on commercial scale. The method comprises the steps of (A) providing the following ingredients in percentages by weight of the sweetening agent delivery system (a) at least one solid natural or artificial high intensity sweetening agent present in an amount from about 0.01% to about 50%, (b) an emulsifying agent present in an amount from about 0.5% to about 20%, and (c) polyvinyl acetate present in an amount from about 40% to about 93% and having a molecular weight range from about 2,000 to about 14,000, and (B) coating the sweetening agent with a polyvinyl acetate matrix coating and granulating the coated sweetening agent by a method which comprises the steps (a) melting and blending the polyvinyl acetate with the emulsifying agent and mixing the sweetening agent therein to form a homogeneous mixture in a heated mixing bowl containing a discharge valve in a Double Planetary Mixer, (b) transferring the mixing bowl containing the homogeneous mixture to a Direct Discharge System containing a hydraulic discharge platen, adapted to fit inside the mixing bowl, and hydraulically discharging the mixture from the mixing bowl through the discharge valve into an air and water cooled Hot Melt Granulator, (c) granulating the mixture into particles in the Hot Melt Granulator, (d) cooling and transferring the particles from the Hot Melt Granulator to an Oscillating Granulator by passing the particles through a Cyclone, and (e) granulating the particles in the Oscillating Granulator to a final desired particle size.

Applicants have discovered that by carrying out the granulation of the sweetening agent delivery system of the present invention in two discrete steps and carefully controlling the temperature of the sweetening agent delivery system during each granulation step, the sweetening agent can be prepared on commercial scale. Prior art methods for preparing the sweetening agent cool the sweetening agent melt to ambient temperatures before grinding the resulting solid to the desired particle size. Because grinding a solid block of sweetening agent on a commercial scale is dangerous, uneconomical and impractical, applicants employ a first crude granulation step of the molten encapsulated sweetening agent in a Hot Melt Granulator at a controlled elevated temperature before a second fine granulation step of the solid coarse granulated encapsulated sweetening agent in an Oscillating Granulator at a controlled lower temperature. Such a two stage granulation of the sweetening agent melt permits the preparation of encapsulated sweetening agent on large scale. In addition, by employing a first crude granulation step, applicants can carry out the second fine granulation step in an Oscillating Granulator and thereby obtain higher yields of granulated sweetening agent by avoiding the fines produced in an impact mill such as those employed in prior art methods.

The sweetening agent delivery system of the present invention is prepared by melting polyvinyl acetate pieces (110° C.–120° C.) in a jacketed mixing bowl (containing a discharge valve) of a Double Planetary Mixer. The melted polyvinyl acetate material is then mixed approximately ten (10) minutes further to ensure a homogeneous mixture. With the temperature of the jacketed mixing bowl maintained, the emulsifier is admixed into the melted polyvinyl acetate material. The melted mixture is then stirred for an additional period of time, generally five (5) to twenty (20) minutes, to obtain a homogeneous mixture at a temperature of approximately 71° C. Sweetening agent, such as milled Acesulfame-K, is then added to the mixer and mixed for approximately five (5) to ten (10) minutes. The material should appear homogeneous and have a temperature no higher than about 73° 1 C.

The mixing bowl containing the melted sweetening agent material is then placed under the Direct Discharge System which discharges the material at a specified rate and temperature into a Hot Melt Granulator. The Direct Discharge System contains a hydraulic discharge platen, preferably heated, adapted to fit inside the mixing bowl. The Direct Discharge System hydraulically discharges the mixture from the mixing bowl through the discharge valve and a transition piece into an air and water cooled Hot Melt Granulator. The transition piece converts the round tubular molten discharge to a flat ribbon-like discharge. This ribbon-like discharge helps to optimize cooling by increasing the surface area per given volume of product. The temperature and discharge rate of the material being discharged and the temperature and rate of air flow are critical. For example, material at too low a temperature will have a high viscosity and can cause overloading of the discharge system. Material at too high a temperature can separate and can also require a slower rate of discharge into the Hot Melt Granulator to give the cooling system of the Granulator more time to cool the hot material. In a preferred embodiment, the temperature of the homogeneous mixture being discharged from the mixing bowl is between about 65° C. and about 73° C. and the mixture is hydraulically discharged from the mixing bowl into the Hot Melt Granulator at a rate of about 1.6 kg/minute.

The material is then granulated into particles in the Hot Melt Granulator. In a preferred embodiment, the granulated particles are passed through a screen, having a size in the range from about 0.125 inch to about 0.375 inch, attached to the Hot Melt Granulator. In a more preferred embodiment, the granulated particles are passed through a 0.25 inch screen attached to the Hot Melt Granulator.

During granulation in the Hot Melt Granulator, the particles are cooled. The particles are then further cooled and transferred from the Hot Melt Granulator to the hopper of an Oscillating Granulator by passing the particles through a Cyclone. In a preferred embodiment, the temperature of the granulated particles transferred into the Oscillating Granulator is between about 22° C. and about 30° C.

The Oscillating Granulator granulates the particles to the final desired mesh size. In a preferred embodiment, the granulated particles are passed through a screen, having a mesh size between about 24 mesh and about 30 mesh, and preferably between about 26 mesh and about 28 mesh, attached to the Oscillating Granulator.

The sweetening agent delivery system of the present invention comprises a core material and a coating layer material. The core material may be selected from a wide variety of materials such as sweetening agents, flavoring agents, medicaments, drugs, and the like, and mixtures thereof. One or more of these core materials may be present within one coating matrix, in a single delivery system, or these core materials may be present in combination but separately coated by the matrix, in a multiple delivery system.

The coating layer material is formed from a combination of an emulsifier with low molecular weight polyvinyl acetate. These coating layers are substantially water-insoluble and protect the sweetening agent, or other encapsulated material, from hydrolytic degradation. Nevertheless, the coatings possess sufficient hydrophilic character to swell in the presence of water and slowly release the core material. Glyceryl monostearate is a preferred emulsifier because it inhibits the hydrolysis of polyvinyl acetate to acetic acid and polyvinyl alcohol.

The sweetening agent delivery system can be used in any food product, chewing gum, confectionery, personal product, pharmaceutical application, denture product, mouthwash, and the like, where it is desirable to protect an artificial sweetening agent from moisture. The coating layers are non-cariogenic and polyvinyl acetate exhibits little or no cold flow on prolonged storage at room temperature. The present method of making the delivery system also employ no solvents.

In a preferred embodiment, the sweetening agent delivery system comprises:
(a) at least one solid natural or artificial high intensity sweetening agent selected from the group consisting of amino acid-based sweetening agents, dipeptide sweetening agents, glycyrrhizin, Saccharin and its salts, Acesulfame salts, cyclamates, steviosides, talin, dihydrochalcone compounds, and mixtures thereof;
(b) an emulsifier present in amounts from about 0.5% to about 20%, by weight of the sweetening agent delivery system, and selected from the group consisting of lecithin, esters of stearates, esters of palmitates, esters of oleates, esters of glycerides, glyceryl monostearate, hydrogenated soybean oil (Durkee 17), sucrose polyesters, polyglycerol esters, and mixtures thereof;
(c) polyvinyl acetate present in amounts from about 40% to about 93%, by weight of the sweetening agent delivery system, and having a molecular weight from about 2,000 to about 14,000 and preferably from about 2 to about 12,000.

Preferably, the emulsifying agent is a combination of glyceryl monostearate and hydrogenated soybean oil present in an amount from about 2% to about 15%, by weight of the sweetening agent delivery system.

In another embodiment, waxes may also be included in the sweetening agent delivery system. These waxes may be selected from the group consisting of animal waxes, vegetable waxes, synthetic waxes, petroleum waxes, and mixtures thereof.

The sweetening agent (sweetener) core component may be selected from solid natural or synthetic sweetening agents capable of imparting high intensity sweetness. These sweetening agents are selected from the group consisting of amino acid-based sweetening agents, dipeptide sweetening agents, glycyrrhizin, Saccharin and its salts, Acesulfame salts, cyclamates, steviosides, talin, dihydrochalcone compounds, and mixtures thereof. In a preferred embodiment, the high intensity sweetening agent is selected from the group consisting of Aspartame, Saccharin and its salts, a mixture of Aspartame and Saccharin, and a mixture of Aspartame and Saccharin together with Acesulfame-K.

In general, an effective amount of intense sweetening agent is utilized in the delivery system to provide the level of sweetness desired, and this amount will vary with the sweetening agent selected. Preferably the intense sweetening agent will be present in amounts from about 0.01% to about 30%, by weight of the delivery system. Aspartame and Saccharin, and its salts, are the preferred sweetening agents and may be used in amounts from about 0.01% to about 50%, preferably in amounts from about 2% to about 10%, most preferably from about 4% to about 6%, by weight of the sweetening agent delivery system. In preferred embodiment, the high intensity sweetening agent is a mixture of Aspartame, in an amount up to about 25%, and Saccharin, in an amount from about 1% to about 50%, by weight of the sweetening agent delivery system. In another preferred embodiment, the above mixture further comprises Acesulfame-K, in an amount from about 0.1% to about 50%, by weight of the sweetening agent delivery system. Additional sweetening agents may also be used in the final product in conventional amounts standard in the industry. The exact range of amounts for each type of sweetening agent is well known in the art and is not the subject of the present invention.

A particularly effective combination of sweetening agents is Aspartame, sodium Saccharin and Acesulfame-K (Potassium Acesulfame). Saccharin, and its salts, and Acesulfame salts may be employed in amounts from about 5% to about 50%, by weight of the delivery system. Aspartame may be employed in amounts up to about 15%, by weight, when used in this combination. One or more of the sweetening agents may be in encapsulated form prior to being incorporated in the delivery system, thus delaying the release of the sweetening agent and lengthening the perceptible sweetness and/or staggering the release. The combination of two or more sweetening agents used alone, or as part of the delivery system, may also improve the sweetness intensity as a result of synergism. Exemplary examples of synergistic combinations are Saccharin-Aspartame, Saccharin-potassium Acesulfame, and Saccharin-Aspartame-potassium Acesulfame.

The sweetening agent delivery system of this invention is in powder or granulated form. The particle size is not critical to the delivery system and can be adjusted to accommodate a particular desired release rate and mouth feel, depending on the vehicle in which it is incorporated. The coating matrix is useful for a variety of core materials in addition to sweetening agents, such as spray dried flavoring agents, drugs and other particulate materials which require a coating for protection, controlled-release or for taste-masking. The sweetening agent delivery systems of this invention are more fully disclosed in U.S. Pat. No. 4,816,265, which disclosure is incorporated herein by reference.

Once prepared, the inventive sweetening agent delivery system may be stored for future use or may be formulated in effective amounts with conventional additives, such as pharmaceutically acceptable carriers or confectionery ingredients to prepare a wide variety of ingestible compositions, such as foodstuffs, beverages, jellies, extracts, hard and soft confectionery products, orally administered pharmaceutical compositions, and hygienic products such as toothpastes, dental lotions, mouth washes and chewing gums.

The amount of the inventive sweetening agent delivery system employed in an edible composition is an effective amount to sweeten the edible composition. The exact amount of the sweetening agent delivery system employed is a matter of preference, subject to such factors as the type of bulking agent or carrier employed in the composition and the strength of sweetness desired. Thus, the amount of sweetening agent composition may be varied in order to obtain the result desired in the final product and such variations are within the capabilities of those skilled in the art without the need for undue experimentation. In general, the amount of sweetening agent delivery system normally present in an edible composition will be from about 10% to about 50%, by weight of the edible composition.

The present invention extends to methods of making the ingestible compositions. In such a method, a composition is made by admixing an effective amount of the sweetening agent delivery system of the present invention with a pharmaceutically acceptable carrier or confectionery material and the other ingredients of the final desired ingestible composition. Other ingredients will usually be incorporated into the composition as dictated by the nature of the desired composition as well known by those having ordinary skill in the art. The ultimate ingestible compositions are readily prepared using methods generally known in the food technology and pharmaceutical arts. In another embodiment, the present invention is directed at a method for sweetening an edible composition which comprises admixing an effective amount of the sweetening agent delivery system with the edible composition.

An important aspect of the present invention includes an improved chewing gum composition incorporating the inventive sweetening agent delivery system and a method for preparing the chewing gum composition, including both chewing gum and bubble gum formulations. In general, the improved chewing gum compositions will contain a gum base, an effective amount of the inventive sweetening agent delivery system, and various additives.

The chewing gum compositions may be reduced-calorie chewing gums employing high levels of a chewing gum base having an enhanced hydrophilic character. These reduced-calorie chewing gums will comprise a gum base present in an amount from about 50% to about 95%, preferably from about 50% to about 85%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

Chewing gum compositions employing a high level of a chewing gum base having an enhanced hydrophilic character are more fully described in U.S. Pat. No. 4,872,884, which disclosure is incorporated herein by reference.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low bulking agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

In one embodiment, the invention pertains to a reduced-calorie chewing gum composition which comprises (A) a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base, (B) a bulking agent present in an amount up to about 60%, by weight of the chewing gum composition, and (C) an effective amount of a sweetening agent delivery system which comprises L-alpha-aspartyl-D-alanine N-(2,2,4,4-tetramethyl-3-thietanyl)amide and a hydrogenated starch hydrolysate.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup Viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin,, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

A gum base utilizing this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F.D.& C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

Other gum bases having an enhanced hydrophilic nature and suitable for use in reduced-calorie chewing gum compositions in high levels may also be employed in the present invention. In general, these gum bases may be employed in amounts up to about 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive sweetening agent delivery system and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 95%, preferably from about 50% to about 85%, and more preferably from about 60% to about 70%, by weight of the chewing gum composition.

In another embodiment, the invention pertains to a chewing gum composition which contains lower amounts of a chewing gum base, i.e., gum base present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the sweetening agent delivery system of the present invention and conventional additives such as a bulking agent to prepare a wide variety of chewing gum compositions.

In addition to the chewing gum base, the chewing gum composition may include a bulking agent. The bulking agents (carriers, extenders), in the present invention may be water-soluble and include sweetening agents selected from the group consisting of, but not limited to, monosaccharides, disaccharides, polysaccharides, sugar alcohols, and mixtures thereof; randomly bonded glucose polymers such as those polymers distributed under the tradename POLYDEXTROSE by Pfizer, Inc., Groton, Conn.; isomalt (a racemic mixture of alpha-D-glucopyranosyl-1,6-mannitol and alpha-D-glucopyranosyl-1,6-sorbitol manufactured under the tradename PALATINIT by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 60%, and preferably in amounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetening agent, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof and fillers such those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63-258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the sweetening agent delivery system of the present invention may be admixed into the chewing gum composition. The exact amount of sweetening agent delivery system employed is normally a matter of preference subject to such factors as the particular type of gum composition being prepared, the type of bulking agent or carrier employed, the type of flavor employed and the intensity of sweetness desired. Thus, the amount of sweetening agent delivery system may be varied in order to obtain the result desired in the final product and such variations are within the capabilities of those skilled in the art without the need for undue experimentation. In general, the amount of sweetening agent delivery system normally present in a chewing gum composition will be from about 1% to about 25%, preferably from about 2% to about 20%, and more preferably from about 5% to about 15%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the sweetening agent delivery system and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the plasticizer, the softener, the bulking agent, and/or fillers, coloring agents and flavoring agents to plasticize the blend as well as to modulate the hardness, viscoelasticity and formability of the base. Finally, the delivery system containing the sweetening agent material is added and mixed for an additional 1 to 10 minutes. The delivery system is added as the last ingredient. Mixing is continued until a uniform mixture of gum composition is obtained. The final gum temperature is about 39° C.—51° C. Thereafter the gum composition mixture may be formed into desirable chewing gum shapes.

In a preferred embodiment, the invention is directed at a method for preparing a chewing gum composition comprising a stable sweetening agent delivery system which comprises the steps of (1) preparing a stable sweetening agent delivery system by the method which comprises the steps of (A) providing the following ingredients in percentages by weight of the sweetening agent delivery system (a) at least one solid natural or artificial high intensity sweetening agent present in an amount from about 0.01% to about 50%, (b) an emulsifying agent present in an amount from about 0.5% to about 20%, and (c) polyvinyl acetate present in an amount from about 40% to about 93% and having a molecular weight range from about 2,000 to about 14,000, and (B) coating the sweetening agent with a polyvinyl acetate matrix coating and granulating the coated sweetening agent by a method which comprises the steps (a) melting and blending the polyvinyl acetate with the emulsifying agent and mixing the sweetening agent therein to form a homogeneous mixture in a heated mixing bowl containing a discharge valve in a Double Planetary Mixer, (b) transferring the mixing bowl containing the homogeneous mixture to a Direct Discharge System containing a hydraulic discharge platen, adapted to fit inside the mixing bowl, and hydraulically discharging the mixture from the mixing bowl through the discharge valve into an air and water cooled Hot Melt Granulator, (c) granulating the mixture into particles in the Hot Melt Granulator, (d) cooling and transferring the particles from the Hot Melt Granulator to an Oscillating Granulator by passing the particles through a Cyclone, and (e) granulating the particles in the Oscillating Granulator to a final desired particle size, and (2) admixing the stable sweetening agent delivery system into a homogeneous mixture of gum base and remaining gum ingredients, and (3) forming the mixture into suitable chewing gum shapes.

Preferably, the temperature of the homogeneous mixture in step (1)(B)(a) is no higher than about 73° C., the temperature of the homogeneous mixture in step (1)(B)(b) is between about 65° C. and about 73° C. and the mixture is hydraulically discharged from the mixing bowl into the Hot Melt Granulator at a rate of about 1.6 kg/minute, the granulated particles in step (1)(B)(c) are passed through a 0.25 inch screen attached to the Hot Melt Granulator, the temperature of the granulated particles in step (1)(B)(d) transferred into the Oscillating Granulator is between about 22° C. and about 30° C., and the granulated particles in step (1)(B)(e) are passed through a screen, having a mesh size between about 24 mesh and about 30 mesh, preferably between about 26 mesh and about 28 mesh, attached to the Oscillating Granulator.

The present invention is further illustrated by the following examples which are not intended to limit the effective scope of the claims. All parts and percentages in the examples and throughout the specification and claims are by weight of the final composition unless otherwise specified.

EXAMPLE 1

This example demonstrates the improved method of the present invention for preparing a stable sweetening agent delivery system on commercial scale.

Polyvinyl acetate was passed through a crusher (Lump Break Greunder, model 9×12 single rotor machine, a Lukens Company, 212 South Oak Street, Durhand, Mich. 48429) to produce pieces approximately one inch in size. Crushed polyvinyl acetate (71.83 Kg, 158.32 lbs) was added to the mixing bowl of a Double Planetary Mixer (Ross model HDM-40 with stainless steel stirrers, jacketed high pressure bowl, discharge valve and variable speed motor). The controls on a Sterl-Tronic hot water heater (model S8424-AIX) were set as follows: Zone 1 (discharge valve)—148° F. (64° C.) and Zone 2 (mixing bowl)—300° F. (150° C.).

With the mixer closed, heating was continued until the polyvinyl acetate melted. The temperature of the mixture was then adjusted to 115° C., plus or minus 5° C., and the mixture was mixed at low speed (approximately 8.7 rpm) for ten (10) minutes until the mixture was uniform.

Zone 2 heater was adjusted to a setting of 65° C. (148° F.). At low speed mixing (approximately 8.7 RPM), partially hydrogenated soybean oil (Durkee 17, 11.34 kg, 25.00 lbs), and glycerol monostearate (11.34 kg, 25.00 lbs) were added through the mixer port, and mixing was continued for approximately ten (10) minutes. The mixer speed was raised to 12 rpm and mixing was continued for five (5) minutes. The temperature was adjusted to 71° C., plus or minus 2° C., and the mixing was continued until the mixture was homogeneous.

With low speed mixing (approximately 8.7 rpm) resumed, milled Acesulfame-K (18.91 kg, 41.38 lbs) was admixed through the mixer port and mixing was continued for approximately ten (10) minutes. The temperature was adjusted, by continued mixing and cooling, to a maximum temperature of about 73° C., and mixing was continued until the mixture was homogeneous.

The mixing bowl containing the melted mixture was transferred to a Direct Discharge System (Ross Direct Discharge System, model 40 gallon DISCH, Charles Ross & Son Company, 710 Old Willets Path, P.O. Box 12308, Hauppauge, N.Y., 11788-0615, stainless steel, heated platen, with adjustable discharge rate sized to configure with the mixing bowl and to accommodate the Hot Melt Granulator). The water in the mixing bowl jacket was circulated at 65° C. (148° F.) to maintain the temperature of the sweetening agent batch between about 65° C. and about 73° C.

The mixture in the mixing bowl was hydraulically discharged at a speed setting of 4.5 (approximately 4 lbs/minute, about 1.6 kg/minute) and at a temperature of about 70° C., through a jacketed transition piece, 3 inches by 0.26 inch, maintained at a temperature of 65° C., directly into the throat of a Hot Melt Granulator Unit (Polymer Systems, 54 Fuller Way, Berlin, Conn. 06037, HMG-1010W, 750 cfm fan fitted with a 0.25 inch screen, model 100 Cyclone, long cone design). The Hot Melt Granulator was adjusted to have a maximum air temperature of 70° F., a minimum air velocity of 4500 feet per minute, an air flow of 750 cubic feet per minute, and chilled water recirculated at a temperature of about 5° C. to about 10° C. The discharge speed may be adjusted to maintain balance of the product flow between the Hot Melt Granulator and the Oscillating Granulator.

The approximate particle size distribution of material separated by the Cyclone from the Hot Melt Granulator using an ATM Sonic Sifter operated at an amplitude of 7 for ten (10) minutes was as follows:

| U.S. Std. Sieve No. | 20 | 30 | 40 | 60 | 80 | 120 | Pan |
|---|---|---|---|---|---|---|---|
| Percent retained | 14 | 12 | 16 | 22 | 13 | 12 | 11 |

The particles from the Hot Melt Granulator were cooled and transferred to an Oscillating Granulator by passing the particles through a Cyclone. The particles were granulated in the Oscillating Granulator, having a 6 mesh size screen, to a final desired particle size. In a preferred embodiment, the temperature of the granulated particles transferred into the Oscillating Granulator is between about 22° C. and about 30° C. and the granulated particles are passed through a screen, having a mesh size of 26 mesh, attached to the Oscillating Granulator.

The approximate particle size distribution of the final product obtained from the Oscillating Granulator using an ATM Sonic Sifter operated at an amplitude of 7 for ten (10) minutes was as follows:

| U.S. Std. Sieve No. | 20 | 30 | 40 | 60 | 80 | 120 | Pan |
|---|---|---|---|---|---|---|---|
| Percent retained | 1 | 1 | 21 | 30 | 17 | 15 | 15 |

The Oscillating Granulator screen may be changed to obtain the required particle distribution.

The invention being thus described, it will be obvious that the same may be varied in many ways. Such variations are not to be regarded as a departure from the spirit and scope of the invention and all such modifications are intended to be included within the scope of the following claims.

We claim:

1. A method for preparing a stable sweetening agent delivery system which comprises the steps of:
   (A) providing the following ingredients in percentages by weight of the sweetening agent delivery system:
   (a) at least one solid natural or artificial high intensity sweetening agent present in an amount from about 0.01% to about 50%;
   (b) an emulsifying agent present in an amount from about 0.5% to about 20%; and
   (c) polyvinyl acetate present in an amount from about 40% to about 93% and having a molecular weight range from about 2,000 to about 14,000; and
   (B) coating the sweetening agent with a polyvinyl acetate matrix coating and granulating the coated sweetening agent by a method which comprises the steps:
   (a) melting and blending the polyvinyl acetate with the emulsifying agent and mixing the sweetening agent therein to form a homogeneous mixture in a heated mixing bowl containing a discharge valve in a Double Planetary Mixer;
   (b) transferring the mixing bowl containing the homogeneous mixture to a Direct Discharge System containing a hydraulic discharge platen, adapted to fit inside the mixing bowl, and hydraulically discharging the mixture from the mixing bowl through the discharge valve into an air and water cooled Hot Melt Granulator;
   (c) granulating the mixture into particles in the Hot Melt Granulator;
   (d) cooling and transferring the particles from the Hot Melt Granulator to an Oscillating Granulator by passing the particles through a Cyclone; and
   (e) granulating the particles in the Oscillating Granulator to a final desired particle size.

2. The method according to claim 1, wherein the high intensity sweetening agent is selected from the group consisting of amino acid-based sweetening agents, dipeptide sweetening agents, glycyrrhizin, Saccharin and its salts, Acesulfame salts, cyclamates, steviosides, talin, dihydrochalcone compounds, and mixtures thereof.

3. The method according to claim 2, wherein the high intensity sweetening agent comprises Aspartame.

4. The method according to claim 2, wherein the high intensity sweetening agent comprises Saccharin and its salts.

5. The method according to claim 2, wherein the high intensity sweetening agent is a mixture of Aspartame, in an amount up to about 25%, and Saccharin, in an amount from about 1% to about 50%, by weight of the sweetening agent delivery system.

6. The method according to claim 5, wherein the high intensity sweetening agent further comprises Acesulfame-K, in an amount from about 0.1% to about 50%, by weight of the sweetening agent delivery system.

7. The method according to claim 1, wherein the emulsifying agent is selected from the group consisting of lecithin, esters of stearates, esters of palmitates, esters of oleates, esters of glycerides, sucrose polyesters, polyglycerol esters, and mixtures thereof.

8. The method according to claim 7, wherein the emulsifying agent is glyceryl monostearate present in amount from about 2% to about 15%, by weight of the sweetening agent delivery system.

9. The method according to claim 1, wherein the polyvinyl acetate has a molecular weight range from about 2,000 to about 12,000.

10. The method according to claim 1, wherein the temperature of the homogeneous mixture in step (B)(a) is no higher than about 73° C.

11. The method according to claim 1, wherein the temperature of the homogeneous mixture in step (B)(b) is between about 65° C. and about 73° C. and the mixture is hydraulically discharged from the mixing bowl into the Hot Melt Granulator at a rate of about 1.6 kg/minute.

12. The method according to claim 1, wherein the granulated particles in step (B)(c) are passed through a 0.25 inch screen attached to the Hot Melt Granulator.

13. The method according to claim 1, wherein the temperature of the granulated particles in step (B)(d) transferred into the Oscillating Granulator is between about 22° C. and about 30° C.

14. The method according to claim 1, wherein the granulated particles in step (B)(e) are passed through a screen, having a mesh size between about 24 mesh and about 30 mesh, attached to the Oscillating Granulator.

15. A method for preparing a chewing gum composition comprising a stable sweetening agent delivery system which comprises the steps of:
(1) preparing a stable sweetening agent delivery system by the method which comprises the steps of:
(A) providing the following ingredients in percentages by weight of the sweetening agent delivery system:
(a) at least one solid natural or artificial high intensity sweetening agent present in an amount from about 0.01% to about 50%;
(b) an emulsifying agent present in an amount from about 0.5% to about 20%; and
(c) polyvinyl acetate present in an amount from about 40% to about 93% and having a molecular weight range from about 2,000 to about 14,000; and
(B) coating the sweetening agent with a polyvinyl acetate matrix coating and granulating the coated sweetening agent by a method which comprises the steps:
(a) melting and blending the polyvinyl acetate with the emulsifying agent and mixing the sweetening agent therein to form a homogeneous mixture in a heated mixing bowl containing a discharge valve in a Double Planetary Mixer;
(b) transferring the mixing bowl containing the homogeneous mixture to a Direct Discharge System containing a hydraulic discharge platen, adapted to fit inside the mixing bowl, and hydraulically discharging the mixture from the mixing bowl through the discharge valve into an air and water cooled Hot Melt Granulator;
(c) granulating the mixture into particles in the Hot Melt Granulator;
(d) cooling and transferring the particles from the Hot Melt Granulator to an Oscillating Granulator by passing the particles through a Cyclone; and
(e) granulating the particles in the Oscillating Granulator to a final desired particle size; and
(2) admixing the stable sweetening agent delivery system into a homogeneous mixture of gum base and remaining gum ingredients; and
(3) forming the mixture into suitable chewing gum shapes.

16. The method according to claim 15, wherein the temperature of the homogeneous mixture in step (1)(B)(a) is no higher than about 73° C.

17. The method according to claim 15, wherein the temperature of the homogeneous mixture in step (1)(B)(b) is between about 65° C. and about 73° C. and the mixture is hydraulically discharged from the mixing bowl into the Hot Melt Granulator at a rate of about 1.6 kg/minute.

18. The method according to claim 15, wherein the granulated particles in step (1)(B)(c) are passed through a 0.25 inch screen attached to the Hot Melt Granulator.

19. The method according to claim 15, wherein the temperature of the granulated particles in step (1)(B)(d) transferred into the Oscillating Granulator is between about 22° C. and about 30° C.

20. The method according to claim 15, wherein the granulated particles in step (1)(B)(e) are passed through a screen, having a mesh size between about 24 mesh and about 30 mesh, attached to the Oscillating Granulator.

* * * * *